Nov. 11, 1958 E. HAGENLOCHER 2,859,637
TORSIONALLY RESILIENT FLEXIBLE FLYWHEEL COUPLINGS
Original Filed Feb. 11, 1952
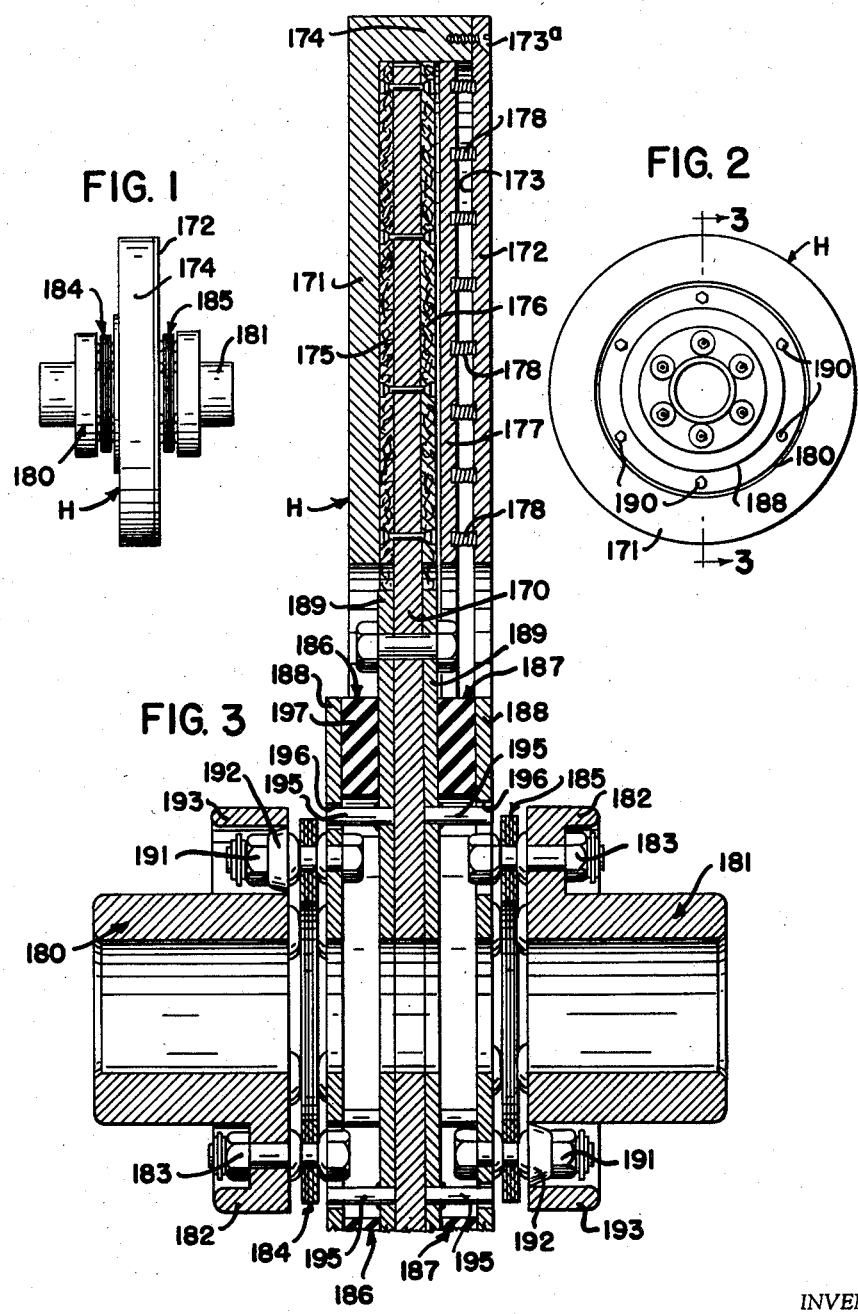
INVENTOR
Ernest Hagenlocher

United States Patent Office 2,859,637
Patented Nov. 11, 1958

2,859,637

TORSIONALLY RESILIENT FLEXIBLE FLYWHEEL COUPLINGS

Ernest Hagenlocher, Warren, Pa.

Original application February 11, 1952, Serial No. 271,008, now Patent No. 2,745,267, dated May 15, 1956. Divided and this application March 19, 1956, Serial No. 572,579

6 Claims. (Cl. 74—574)

This invention relates to improvements in torsionally resilient flexible flywheel couplings.

The present application is a division out of my parent application Serial No. 271,008, filed February 11, 1952 a part of which has issued as U. S. Patent 2,745,267, dated May 15, 1956.

The primary object of the invention is the provision of an improved flexible coupling of the general type set forth in U. S. Patent 2,182,711 and having incorporated therewith a torsionally resilient feature such as generally set forth in my Patent 2,593,877 and additionally including a vibration dampened floating flywheel.

In the drawings:

Figure 1 is an elevation view of an improved coupling structure associated with a floating flywheel, for the purpose of taking care of end float, misalignment and angular deflections between the drive and driven elements.

Figure 2 is an end elevation of the coupling structure of Figure 1.

Figure 3 is an enlarged fragmentary cross sectional view taken through the coupling structure of Figure 2 substantially on the line 3—3 of Figure 2.

The heavy coupling structure is generally designated as H. The flywheel includes a center main member or plate 170 having the ring shaped or flanged portions 171 and 172 defining a space 173 therebetween. The plate 172 may be detachably connected at 173ª to the circumferential flange 174 of the plate 171. The center member 170 at opposite sides, within the space 173, is provided with brake linings 175 and 176, and the clutch plate 177 may be spring urged at 178 into engagement with the brake lining 176. It is shown in the drawing Figure 3 as spaced, for purposes of clarification.

The flexible coupling structure associated with the floating flywheel preferably includes the shaft attaching coupling members or flanges 180 and 181, each including a hub portion and attaching flange 182. The latter are connected in the usual manner by bolt assemblages 183 to sets of laminated flexible steel disc sets 184 and 185. At opposite sides of the central member 170 there may be provided rubber sandwiches 186 and 187, each including outer rigid steel plate members 188 and inner steel plate members 189; the latter being connected by bolts 190 to the central member 170 of the flywheel structure. The plates 188 are connected by bolt assemblages 191 to the laterally flexible steel disc sets 184 and 185, as shown in the drawing. Each of these bolt sets 191 may include a safety factor bushing 192 which extends into a clearance opening 193 of the coupling flange 182, as shown in Figure 3.

Motion limiting means for the rubber sandwiches is provided, comprising pins 195 fixedly secured to the plates 189 and extending across the space between the sandwich plates and operating at their free ends in oblong openings 196 of the opposite plates, for the purpose of limiting torsional strains upon the rubber cores 197.

In lieu of the attachment of the rubber sandwiches and discs to the central plate 170, the attaching of them could just as well be made to the casing plates 171 and 172 of the flywheel structure or to the coupling flanges.

Various changes in the size, shape and arrangement of parts may be made to the form of invention herein shown as described, without departing from the spirit of the invention or scope of the claims.

I claim:

1. In a flywheel coupling construction the combination of a floating flywheel structure including a central heavy rotary flywheel member, attaching coupling parts, means connecting said attaching coupling parts to said central member including laterally flexible steel disc laminations for taking care of misalignment and end float, and rubber means connecting to both said laminations and said central member to take care of torsional deflection in a plane transverse to the axis of the coupling parts.

2. In a flywheel and coupling construction the combination of a floating flywheel structure including a rotatable part, attaching coupling parts at opposite sides of the rotatable main part, sets of laterally flexible steel laminations, means connecting said sets of steel laminations to said attaching coupling parts, rubber means at opposite sides of the rotatable main part of said floating flywheel structure, means connecting said rubber means to said rotatable main part to take care of torsional stresses, and means connecting said rubber means to said sets of laminations at locations circumferentially spaced from the locations where said disc sets are connected to said attaching coupling parts.

3. In a flywheel and coupling construction the combination of a floating flywheel structure including a central plate member and a radially outer annularly weighted ring shaped connected structure attached thereto, a pair of rubber sandwiches, one at each side of the central member of the flywheel structure, each of said rubber sandwiches including a rubber core and adjacent inner metal end plates and outermost metal end plates respectively bonded to the rubber cores of the sandwiches, the inner plates being of greater diameter than the outer plates and extending beyond the rubber cores of the sandwiches and there being bolted to said central member, a pair of shaft coupling flanges, a pair of transversely flexible laminated disc sets, bolts connecting a disc set to each of the shaft attaching flanges at spaced circumferential locations, and bolts connecting the transversely flexible disc sets to the outermost plates of the rubber sandwiches at zone locations circumferentially spaced with respect to those locations where said sets are bolted to the adjacent shaft coupling flanges.

4. A coupling structure as defined in claim 3 in which means is provided upon the respective plates of each of the rubber sandwiches to limit the torsional deflection of the rubber cores of said rubber sandwiches.

5. In a flywheel type coupling construction for taking care of conditions of misalignment and torsional deflections the combination of a heavy rotary flywheel construction, a shaft attaching coupling part, a transversely flexible laminated metal disc set connected at spaced zones to the coupling part, a rubber member connected at one side to the flywheel, and spaced connections secured to the other side of the said rubber member connecting the rubber member to said flexible disc set, the connections of said rubber member to the disc set being located at zones circumferentially spaced from those zones at which said disc set is connected to the coupling member, said rubber member being connected to the flywheel and to the disc set for the purpose of taking care of torsional deflections in a plane transverse to the axis of the coupling part and the disc set being flexible in line of the axis of the coupling part.

6. A flywheel coupling construction as defined in claim 5 in which the flywheel, coupling member, disc set and attaching part are all located in parallel planes.

References Cited in the file of this patent

UNITED STATES PATENTS

| | | |
|---|---|---|
| 1,356,024 | Sullivan | Oct. 19, 1920 |
| 1,683,954 | Carrey | Sept. 11, 1928 |
| 1,881,393 | Wood | Oct. 4, 1932 |
| 2,361,266 | Clark | Oct. 24, 1944 |

FOREIGN PATENTS

| | | |
|---|---|---|
| 329,436 | Great Britain | May 22, 1930 |

UNITED STATES PATENT OFFICE
CERTIFICATE OF CORRECTION

Patent No. 2,859,637                                           November 11, 1958

Ernest Hagenlocher

It is hereby certified that error appears in the printed specification of the above numbered patent requiring correction and that the said Letters Patent should read as corrected below.

Column 2, line 22, after "rotatable" insert -- main --; line 65, for "to", second occurrence, read -- at --.

Signed and sealed this 3rd day of February 1959.

(SEAL)

Attest:

KARL H. AXLINE

Attesting Officer

ROBERT C. WATSON
Commissioner of Patents